United States Patent [19]

Pearce

[11] Patent Number: 5,035,075
[45] Date of Patent: * Jul. 30, 1991

[54] FISHING LURE

[75] Inventor: Frank G. Pearce, Garland, Tex.

[73] Assignee: Powerpak Lures, Inc., Garland, Tex.

[*] Notice: The portion of the term of this patent subsequent to Jun. 23, 2004 has been disclaimed.

[21] Appl. No.: 355,990

[22] Filed: May 23, 1989

Related U.S. Application Data

[63] Continuation-in-part of Ser. No. 65,301, Jun. 22, 1987, Pat. No. 4,831,767, which is a continuation-in-part of Ser. No. 765,384, Aug. 13, 1985, Pat. No. 4,674,223, which is a continuation-in-part of Ser. No. 595,392, Mar. 30, 1984, abandoned.

[51] Int. Cl.$^5$ ............................................. A01K 15/06
[52] U.S. Cl. ...................................... 43/26.2; 43/42.3; 43/42.02
[58] Field of Search ................. 43/26.2, 26.1, 42, 42.3, 43/42.02, 42.45, 42.35; 446/158, 333, 353, 354

[56] References Cited

U.S. PATENT DOCUMENTS

| 726,021 | 4/1903 | Bryan . | |
|---|---|---|---|
| 891,037 | 6/1908 | Caldwell . | |
| 1,758,160 | 5/1930 | Lee . | |
| 2,229,175 | 1/1941 | Johnson . | |
| 2,284,183 | 5/1942 | Wade . | |
| 2,555,802 | 6/1951 | Martin . | |
| 2,724,205 | 11/1955 | Howard . | |
| 2,754,609 | 7/1956 | Schultz . | |
| 2,813,365 | 11/1977 | Cross . | |
| 2,932,112 | 4/1960 | Graves, Jr. . | |
| 3,007,276 | 11/1961 | Lidert | 43/26.2 |
| 3,153,871 | 10/1964 | Semba . | |
| 3,457,667 | 7/1969 | Tripp . | |
| 4,068,401 | 1/1978 | Saitoh . | |
| 4,674,223 | 6/1987 | Pearce | 43/26.2 |
| 4,831,767 | 5/1989 | Pearce | 43/26.2 |
| 4,832,650 | 5/1989 | Tong | 43/26.2 |

Primary Examiner—Kurt Rowan
Assistant Examiner—James Miner
Attorney, Agent, or Firm—Richards, Medlock & Andrews

[57] ABSTRACT

A fishing lure for use in a body of water has a lure body with hooks attached thereof. An energy storage mechanism is mounted in the body and a line is connected to the energy storage mechanism and extends from the lure body. The energy storage mechansim is operable by engagement of the line. An appendage extends externally of the lure body for movement about a substantially horizontal axis upon operation of said energy storage mechanism. Additionally, the lure contains ballast to properly orient the lure in the water.

11 Claims, 6 Drawing Sheets

FISHING LURE

CROSS-REFERENCE TO RELATED APPLICATION

This application is a continuation-in-part application of patent application Ser. No. 065,301, filed June 22, 1987, now U.S. Pat. No. 4,831,767, which application was a continuation-in-part application of application Ser. No. 765,384, filed Aug. 13, 1985, now U.S. Pat. No. 4,674,223, which application was a continuation-in-part application of patent application Ser. No. 595,392, filed Mar. 30, 1984 now abandoned.

TECHNICAL FIELD

The present invention relates to fishing lures and more particularly to a fishing lure having a line activated spring mechanism mounted within the body of the lure for driving lure body components projecting therefrom.

BACKGROUND ART

Mechanically propelled fishing lures have been proposed in several different embodiments in the past. Generally, these lures have been unreliable and overly complex in their structure. Prior attempts to produce a successful mechanically propelled lure have included attempts to store driving energy in elastic bands, such as in U.S. Pat. No. 2,183,365, to A. B. Cross. These structures have not provided reliability and have not produced a manner of operation of the lure which properly simulates the live action of fish or other bait. Attempts have also been made to simulate live action by using springs. Two such attempts are shown in U.S. Pat. No. 2,932,112, to E. G. Graves, Jr. and in U.S. Pat. No. 3,457,667 to A. M. Tripp. However, because of the manner of use of the springs in these, and other comparable references, accurate simulation and reliable operation has not been achieved.

Because of the unreliability of such mechanical devices, resulting in part from the direct loading of the spring mechanism and the effect of water impurities on these components, some attempt has been made to use electrically and chemically powered animated lures. In these arrangements, batteries must be stored in the body of the lure making the lure bulky and necessarily requiring repeated replacement and recharging of the battery as its power is consumed. The use of chemically activated devices also has been found to be unreliable, expensive and difficult to maintain in proper operation over extended periods of use.

Thus, a need has arisen for a reliable, yet relatively simple and easy to manufacture, mechanically driven lure which can be selectively and repeatedly activated by line action after casting the lure and which can withstand the high loading occasioned in gamefish angling.

DISCLOSURE OF THE INVENTION

With the limitations of these prior devices in mind, the present invention provides a fishing lure which overcomes the deficiencies recited above. In accordance with one embodiment of the invention, the fishing lure according to the present invention has a body structure with hooks attached thereto. A windup mechanism comprises a spool and a sealed enclosure incorporating a rust-proof spring, and gear train operating in conjunction with the spool to store energy therein. The fishing line is attached to and wound around the spool and the coil spring is tensioned by line-action, that is the angler's retrieve after casting of the lure.

Appropriate appendages, such as a movable tail fin, movable legs or wings, extend externally from the body of the lure and are driven by the windup mechanism. A shaft extends through the windup mechanism and the spool and is secured in the lure body. An appropriate gear train is used to interconnect the windup mechanism to the propulsion structure such that oscillating movement is transmitted from the windup mechanism to the propulsion means.

Rotation of the spool winds the spring in the windup mechanism. A line is attached to the spool and extends therefrom out of the body structure. By pulling on the line, the spool is rotated to thereby wind the coil spring and store energy therein. Upon release of the line, the spool is rotated under the action of the uncoiling of the spring to draw in the line by winding the line around the spool. The rotation of the coil spring is transmitted by the gear train to provide an oscillating movement to the tail fin, legs or wings extending from the body of the lure.

In accordance with a further embodiment of the invention, the spool is positioned below the windup mechanism and the hooks are mounted to the body at substantially the same elevation as the spool.

In accordance with still another embodiment of the invention, the windup mechanism and spool are mounted with their axes of rotation substantially parallel to the longitudinal axis of the lure. In this embodiment, the line extends from the spool around a post mounted in the body of the lure and then out of the body substantially along the longitudinal axis thereof.

In accordance with still a further embodiment of the invention, the lure is designed such that the line exits the body portion to the rear of the lure. Thus, activation of the lure causes the lure to be propelled or "swim" away from the angler.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION

Figures 1, 2:
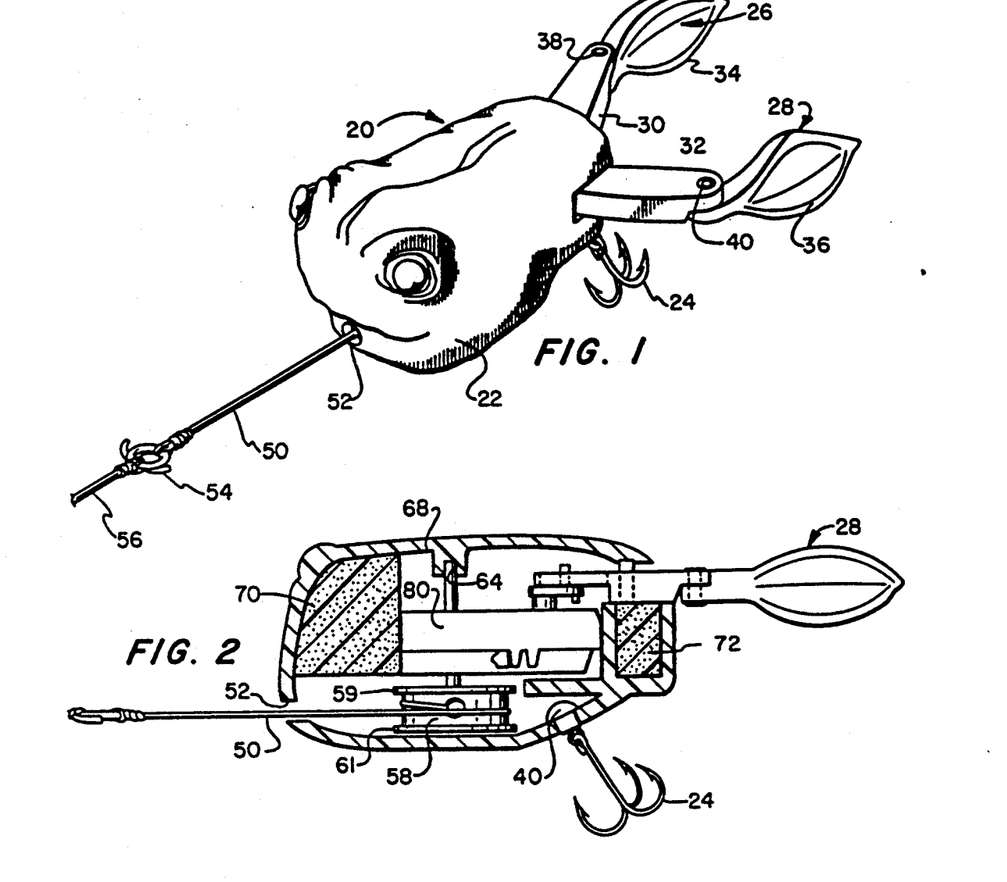
FIG. 1 is a perspective view of the lure of the present invention.
FIG. 2 is a vertical section view showing the internal structure of the lure.

Referring to the drawings, and specifically FIGS. 1 and 2, the present invention is to an artificial game fish lure 20 having a main body portion 22 with one or more fishing hooks 24 attached thereto. In the embodiment illustrated in FIGS. 1 and 2, the lure body is a simulation of a from and as the propulsion means, a pair of legs 26 and 28 extend from the rearward portion of body 22. Legs 26 and 28 include a main leg portion 30 and 32, respectively, with fin ends 34 and 36, respectively attached to the main portions by pins 38 and 40, respectively. Hook 24 is mounted to body 22 by an appropriate fastener 42, or its equivalent. A line 50 extends from the forward end of body 22 through an aperture 52 and has a ring 54 attached to its end for receiving a fishing line 56 as in the usual manner. Referring to FIG. 2, line 50 is attached to and engaged around a spool 58 mounted for rotation on a shaft 60. Spool 58 has an upper and lower lip 61 to facilitate retention of line 50 on the spool during winding and unwinding. Shaft 60 has its upper end mounted for rotation in receiving aperture 64 in boss 68.

Figure 3:
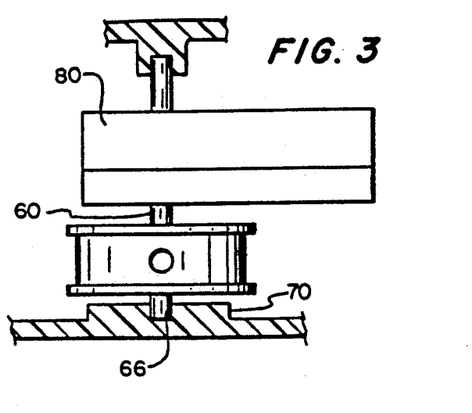
FIG. 3 is an enlarged view of an alternative attachment for the windup mechanism and spool used in the present invention.

In an alternative preferred embodiment shown in FIG. 3, the lower end of shaft 60 is also supported in body 22 by location in aperture 66 in boss 76. In this embodiment, the shaft 60 is then supported both above and below spool 58 to provide an improved arrangement for transfer of loading from line 50 to the body of the lure.

Figure 4:
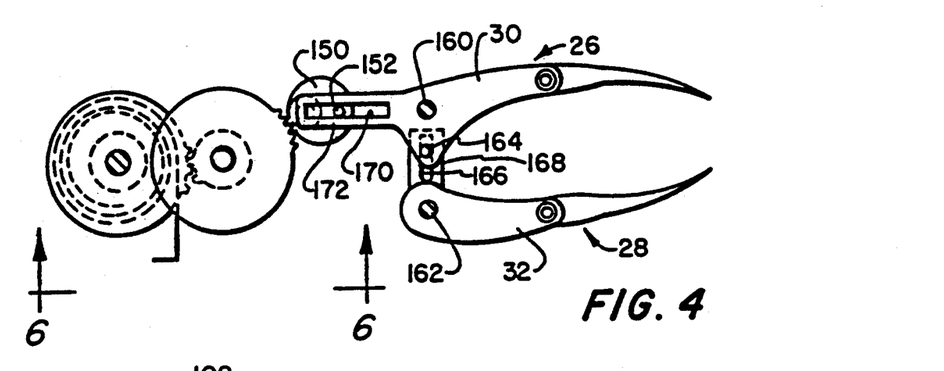
FIG. 4 is a plan view of the transmission structure of the present invention.
Figure 5:
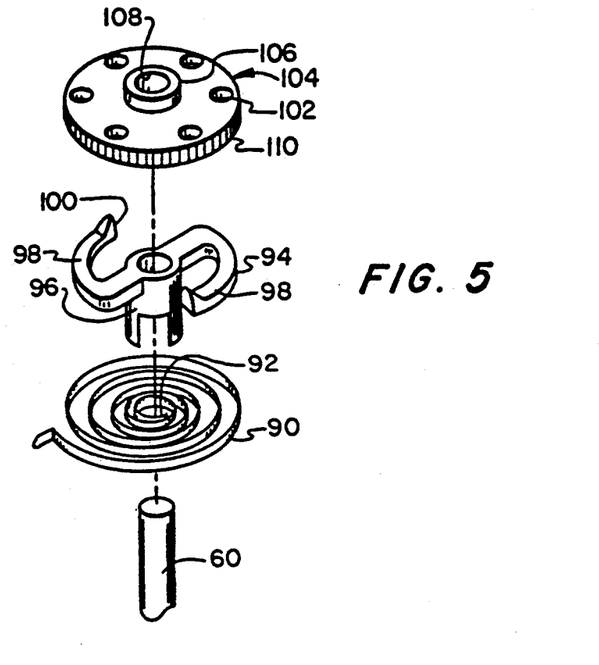
FIG. 5 is an exploded view of the windup mechanism of the present invention.
Figure 6:
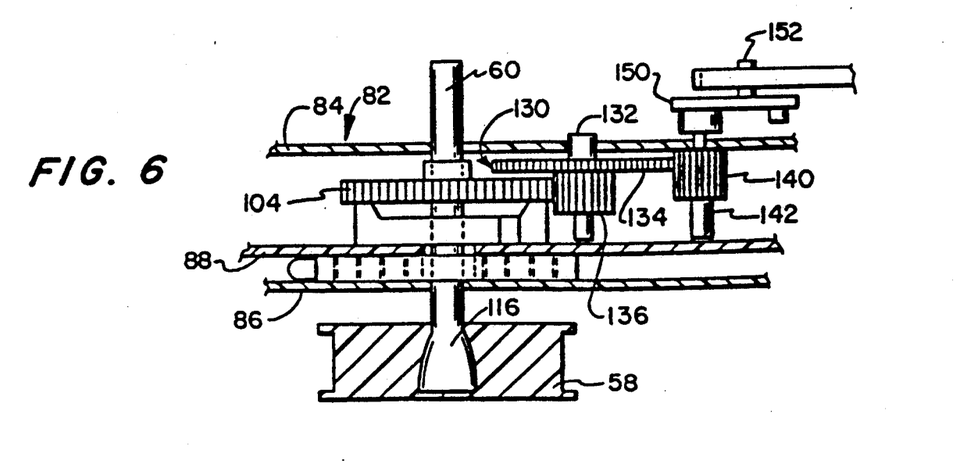
FIG. 6 is a section view of the transmission structure, windup mechanism and spool of the present invention.

Spool 58 is positioned below and shaft 60 extends through a windup mechanism 80. While the embodiment illustrated in FIG. 2 shows spool 58 positioned below windup mechanism 80, it will be appreciated that the spool may be positioned above the mechanism with the same advantages provided in the embodiment of FIG. 2. Windup mechanism 80 is best shown in FIGS. 4, 5, and 6. Referring to these figures, windup mechanism 80 includes an outer housing 82 having an upper wall 84, a lower wall 86 and an intermediate wall 88. A coil spring 90 is mounted between walls 86 and 88 with its inner end 92 engaged around shaft 60. A spider gear 94, having a hub 96 and spider arms 98 extending therefrom, is press mounted onto and rotates with shaft 60. Hub 96 extends through an aperture in wall 88 and engages end 92 of spring 90. Spider arms 98 of gear 94 are positioned above wall 88. Arms 98 include clutch teeth 100 at the end thereof for clutch engagement with a plurality of apertures 102 in gear 104 mounted above spider gear 94. Gear 104 includes a hub 106 having an aperture 108 therethrough for mounting the gear on shaft 60. Gear 104 also has a plurality of teeth 110 on the circumference thereof. As can be seen in FIG. 6, spool 58 is mounted below wall 86 and the lower end of shaft 60 is flared at 116 so that the spool may be securely attached thereto.

As can also be seen in FIG. 6, lower and upper walls 86 and 84 have apertures therethrough for receiving shaft 60. Because it has been found that the components of windup mechanism 80 will be affected by the natural impurities in lake water and other similar environments, the windup mechanism is sealed to prevent such impurities from coming into contact with the components of mechanism 80. Thus, the apertures in walls 84 and 86 are, in one embodiment, sized to such close tolerances as to fit closely to shaft 60. Further, the remainder of the case surrounding the windup mechanism is also sealed thereby preventing the entry of contaminants into the windup mechanism enclosure. It will of course be appreciated that as an alternative, the apertures in walls 84 and 86 may be enlarged to receive seals therein, such as of plastic or rubber, to provide an even closer contact to shaft 60. However, it is found that this is not necessary in most applications of the present invention. As a further alternative. the structure of the main body portion 22 may be designed to encase the windup mechanism and provide a water resistant seal around the mechanism.

As can be seen in FIG. 2, a gear train structure 120 connects windup mechanism 80 to legs 26 and 28. This gear train structure is best shown in FIGS. 4 and 6. Referring first to FIG. 6, this structure includes a dual gear 130 having a shaft 132 for engagement through walls 84 and 86 for rotation relative thereto. Gear 130 includes a larger upper gear segment 134 and a smaller lower gear segment 136. As can be seen in both FIGS. 4 and 6, lower gear segment 136 meshes with gear 104. A third gear 140 has a shaft 142 for engagement through upper wall 84 and intermediate wall 88 for a rotation relative thereto. Gear 140 is mounted such that it is in meshing engagement with the upper gear segment 134 of gear 130 A disk 150 is mounted to the upper end of shaft 142 and has a pin 152 extending upwardly from disk 150 at a predetermined distance from the axis of rotation about shaft 142.

Referring now to FIG. 4 in conjunction with FIGS. 2 and 6, leg segments 30 and 32 are pinned to body 22 by pins 160 and 162, respectively. Leg segment 30 has a pin 164 which engages a slot 166 in a extension 168 from leg portion 32 such that rotation of leg portion 30 about pin 160 results in the rotation of leg portion 32 about pin 162. Pin 152 of disk 150 moves in a slot 170 in an extension 172 of leg portion 30. Thus, by rotation of disk 150, the movement of pin 152 in rotation about the axis of shaft 142 results in the oscillation of leg portion 130 and a corresponding oscillation or pivoting of leg portion 32.

Rotation of disk 150 is accomplished by the rotation of shaft 60. This is accomplished by winding spool 58 and shaft 60 to first coil spring 90 and then the release of spool 58 to permit spring 90 to uncoil. As can be appreciated, the clutch action of spider gear 94 will permit the winding of spring 90 without the rotation of gear 104. This is the result of the indexing of spider gear 94 relative to gear 104 by flexing of spider arms 98 and the indexing of clutch teeth 100 relative to apertures 102. This indexing movement produces a "clicking" sound which adds to the effectiveness of the lure from the standpoint of attracting fish or other game. Upon the release of spool 58, and the unwinding of spring 90, clutch teeth 100 of spider gear 94 will engage apertures 102 of gear 104 to rotate gear 130 and in turn gear 140 to drive disk 150 and oscillate legs 26 and 28 of the lure. The unwinding of springs 90 also rotates shaft 60 to rotate spool 58 and automatically wind in line 50 attached thereto. Thus, the present invention provides for the automatic rewinding of line 50.

Referring again to FIG. 2, the fishing lure includes a forward cavity 70 having a sealed space or buoyant material, such as styrofoam or the like, therein. The body also includes a rear cavity 72 also sealed or filled with a buoyant material, such as styrofoam. These materials and the overall design of the lure provide the lure with a floating position such as shown in FIGS. 7 and 8, although underwater line application is also available.

Figures 7, 8:
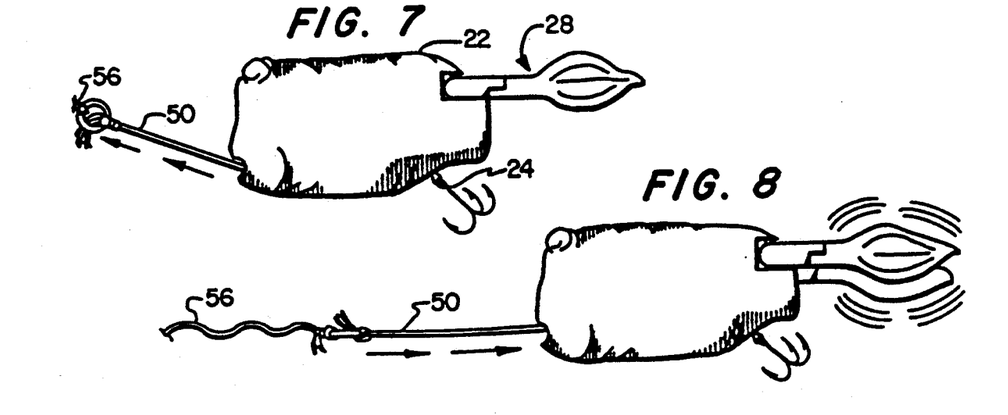
FIGS. 7 and 8 illustrates the operation of one embodiment of the present invention.

Operation of the lure is best understood by reference to FIGS. 7 and 8. The lure is activated by the angler's retrieve by using a popping or chugging rod tip pull to apply a tension to line 50. It will be appreciated that line 50 is initially wound around spool 58 and by applying a tension to line 50, the spool is unwound to rotate spider gear 94 (which is pressed onto shaft 60). As soon as tension is released on line 50, spring 90 begins to uncoil thereby rotating gear 104 and the gear train structure described hereinabove to oscillate legs 26 and 28. The oscillation of the legs causes lure 20 to swim and move in the water as though it is a live bait. This action can be repeated as many times as it is desirable to cause the lure to move in the water. During operation of the windup mechanism and the gear train, an audible "clicking" sound is produced as spider gear 94 is indexed relative to gear 104 by virtue of pulling on line 50 and rotating spool 58 and shaft 60. Further, a different, but still audible, buzz sound is produced upon release of tension on line 50 as the spring unwinds and expands. This sound is also a result of the quick movement of the gear train components and moving body parts. Thus, the present invention provides a device which not only can be line actuated to produce movement of body parts of the lure, but also produces two different sounds, one upon winding and one upon unwinding, which further attracts fish and other game. This audible sound greatly adds to the success of the lure.

Figure 9:
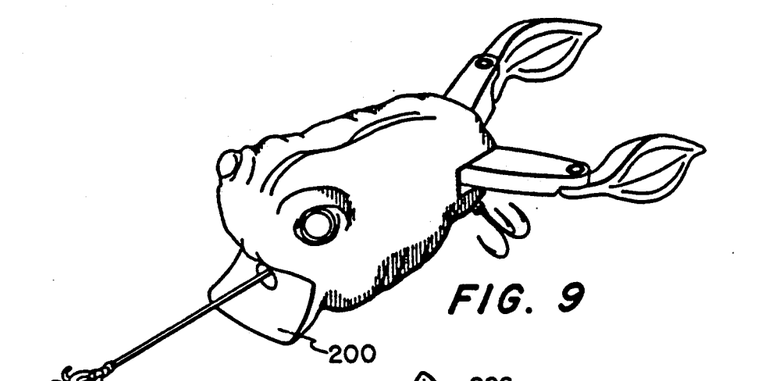
FIG. 9 is an alternative embodiment of the invention illustrated in FIG. 8 showing a lower lip portion for resisting forward movement of the lure.

This action is improved by incorporating the modification showed in FIG. 9. A lip or concave face 200 is mounted at the forward end of lure body 22 to provide resistance to the movement of the lure through the water such that sufficient tension can be applied to the lure to wind the spring mechanism without movement of the lure in water to any appreciable extent.

Figure 10:
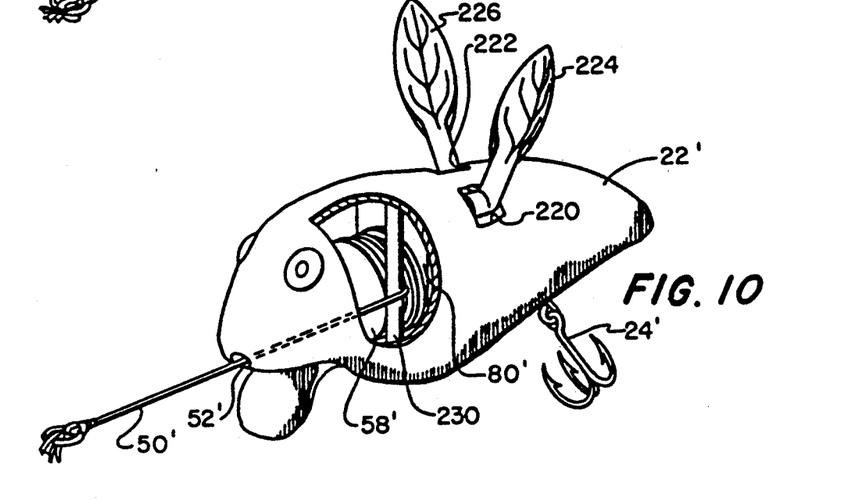
FIG. 10 is a partially broken away prospective view of an alternative embodiment of the present invention wherein the windup mechanism and spool are mounted with their axes of rotation substantially aligned with the longitudinal axis of the lure.

FIG. 10 illustrates a further embodiment of the present invention. In this embodiment, the spool, spring mechanism, transmission structure and propulsion structure are mounted such that the rotation of the spool and spring mechanism is about an axis substantially aligned or parallel with the longitudinal axis of the lure. As a result, the movement of the externally extending appendages are also about axes substantially parallel to the longitudinal axis of the lure. This provides for a flapping action which simulates wing movement, rather than leg or fin movement. This movement has been found to be extremely successful in attracting fish and thus provides a lure which is highly successful.

This embodiment incorporates some of the same components as those described in the embodiment of FIGS. 1 through 8. These similar structures will be referred to using the same numerals as in the first embodiment but with the addition of a prime (') designation. Referring to FIG. 10, the lure includes a lure body 22' with a hook 24' attached thereto. A spool 58' and the associated spring mechanism 80' and transmission structure, as described in the earlier embodiment, are arranged such that the axis of rotation is substantially aligned with or is parallel to the longitudinal axis of the lure body 22'. As can be seen in FIG. 10, body 22' has a pair of openings 220 and 222 through which appendages 224 and 226 extend. These appendages 224 and 226 are comparable to leg segments 30 and 32 described with respect to the embodiment of FIGS. 1 through 8. However, they extend substantially upwardly from body 22' and their oscillation results in a simulation of wings rather than the movement of legs or fins.

To accomplish the rotation of spool 58', a post 230 is mounted in body 22' to one side of spool 58'. Line 50' is directed from spool 58' around post 230 and exits through forward aperture 52'. Thus, the present embodiment provides a lure which provides for wing movement but incorporating a very compact arrangement of spool, spring mechanism and gear train such that the lure can be made compact and of the sizes popularly accepted by fishermen.

Figure 11:
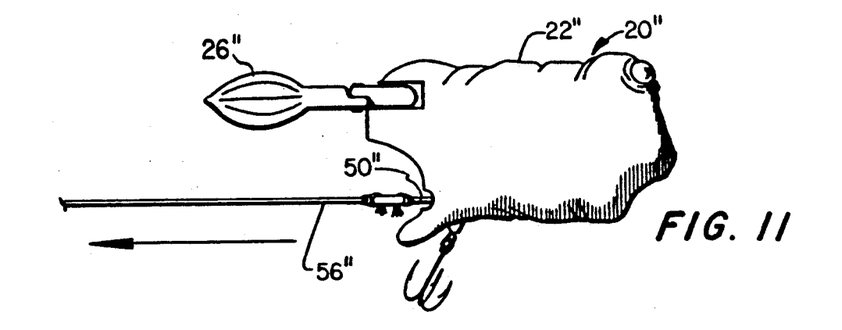
FIG. 11 is an alternative embodiment of the present invention.

FIGS. 11 shows a further embodiment of the present invention incorporating many features similar to or analogous to those described with respect to the embodiment illustrated in FIGS. 1 through 8. Thus, to avoid duplication of description, these comparable or analogous structures will be referred to using the same numbers as used to described the embodiment of FIGS. 1 through 8 but the addition of a double prime (") designation. The embodiment of FIG. 11 permits the activation of legs 26" of a lure 20" such that the lure will swim away from the angler upon activation. In this embodiment, line 50" extends from the rear of the lure through an aperture 250. Thus, in this embodiment, the fisherman may pull in the lure during activation and the lure will swim away from the fisherman.

As can be appreciated from the above description and discussion, the present invention allows live bait action in an artificial lure in a manner currently unavailable in existing lures. The present lure is self-winding by the line action. This is accomplished by a highly reliable activation mechanism which is compact and permits the design of popular ¼ or ½ ounce lure sizes, and can be filled to any size fishing lure including saltwater models. Further, the structure incorporates an optimum positioning of the line and its attachment to a spool mounted below. In one embodiment, the spring mechanism dispositions the line substantially in alignment with the hooks, mounted on the lower portion of the lure. Further, the spool on which the line is wound and to which it is attached, is supported on a shaft which is journaled at both the upper and lower end to the body of the lure. Thus, upon catching a fish, loading through the line passes directly from the spool to the body of the lure and such that none of the load is taken in the spring mechanism. Thus, the loading occasioned by catching a fish is not felt at all by the spring mechanism. This action is accomplished by a purely mechanical structure without the attendant problem which occasions the use of batteries or chemicals.

The particular structure of the windup mechanism, gear train and moving body parts also produces an audible sounds during operation. These sounds, resulting from the expansion of the spring and rapid movement of the moving parts and from the indexing of the gear train components, add greatly to the overall effectiveness of the lure.

A further embodiment of the present invention provides a direct application of the structure of the primary embodiment such that the movement of the lure may be accomplished while maintaining the pull of the lure from either the forward or rear of the lure itself.

Figure 12:
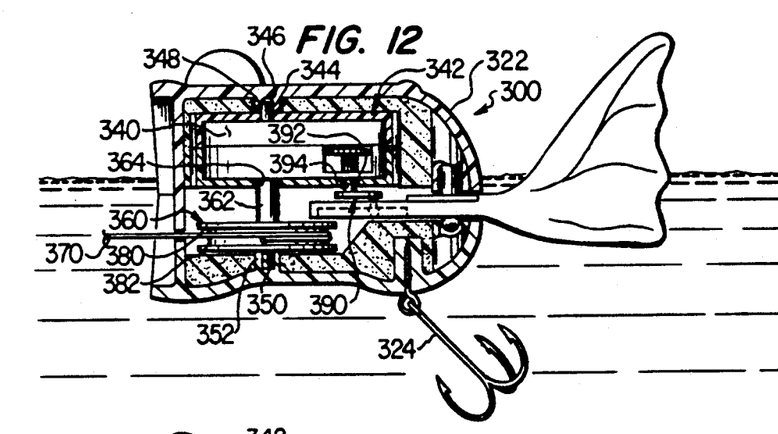
FIG. 12 is a vertical section view of an alternative embodiment of the present invention showing the internal structure of the lure.
Figures 13, 14:
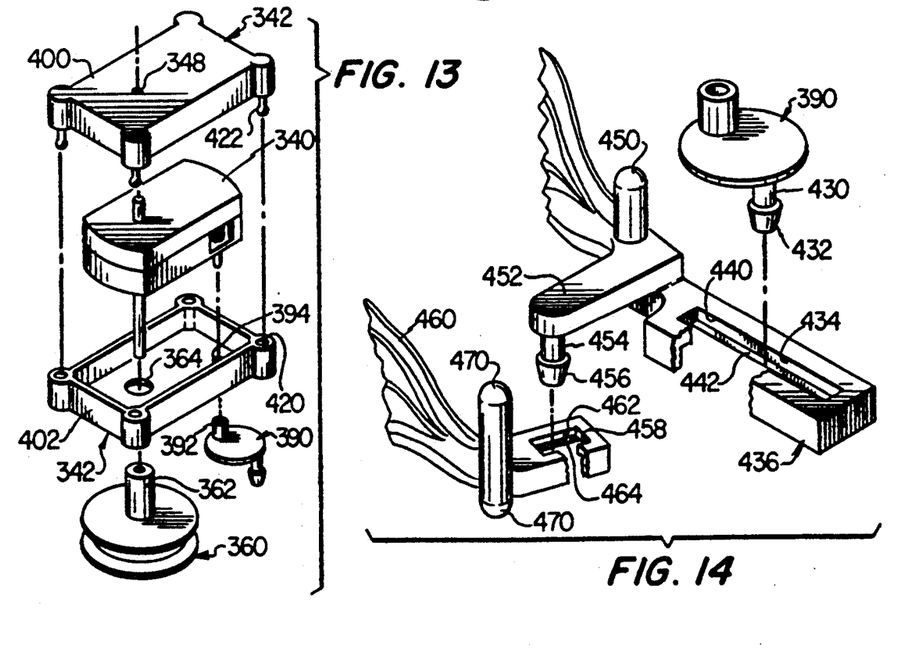
FIG. 13 is an exploded view showing the windup mechanism and associated structure used in the alternative embodiment of FIG. 12.
FIG. 14 is an exploded view showing the connecting structure between the movable legs and drive mechanism for the alternative embodiment of FIG. 12.

FIGS. 12 through 14 illustrate an alternative embodiment of the present invention wherein the lure is designed to further isolate the windup mechanism from contaminants in the water in which the lure is used. The alternative embodiment also includes a alternative design for the attachment of the drive mechanism to the oscillating legs and attachment between the legs.

Referring specifically to FIG. 12, an alternative lure 300 is shown in section view having a main body portion 322 with one or more fishing hooks 324 attached thereto. Main body portion 322 houses a windup mechanism 340 having a water tight enclosure 342 therearound and a shaft 344 extending above and below the mechanism. The upper end of shaft 344 is journaled in an aperture 346 in boss 348 and the lower end of shaft 344 is journaled in an aperture 350 in boss 352. Bosses 348 and 352 are integrally formed in main body portion 322 for transmitting loads between the shaft and the body portion.

A spool 360 is received on the lower end of shaft 344 and has a sleeve 362 which extends through an aperture 364 in enclosure 342 for positioning adjacent to windup mechanism 340. As with the previously described embodiment, spool 360 receives a line 370 thereon with its end attached to spool 360 for winding therearound. Spool 360 has upper and lower lips 380 and 382, respectfully, to define an area between which line 370 may be wound.

Windup mechanism 340 is similar in structure and operation to that illustrated and described with respect to the prior embodiments with the exception that a drive disk 390 is mounted from a shaft extended from below mechanism 340 rather than above, as shown and described with respect to the previous embodiment illustrated in FIG. 6. With the exception of this change, windup mechanism 340 is substantially the same as that previously described and thus will not be described here in detail. Disk 390 has a shaft sleeve 392 which extends through an aperture 394 in enclosure 342 for abutment adjacent to mechanism 340.

The mounting of watertight enclosure 342 adjacent windup mechanism 340 is best shown in FIG. 13. Enclosure 342 includes upper and lower sections 400 and 402, section 400 including aperture 346 for receiving shaft 344 therethrough and lower section 402 including apertures 364 and 394 for receiving sleeves 362 and 392 of spool 360 and drive disk 390, respectfully.

Lower section 402 of enclosure 342 has a plurality of receiving apertures 420 for receiving male ends 422 for interlocking the enclosure segments together over windup mechanism 340. While this means of attachment is disclosed, it will be appreciated by those skilled in the art that other equivalent means of attachment could be incorporated. For example, cement or various latching mechanisms could be substituted. It will further be understood that the apertures 346, 364 and 394 will be sized to provide a close, but not friction fit, between the components passing therethrough, the objective being to isolate the windup mechanism from debris and other contaminants while not interfering with the movement of the components during operating the lure.

Referring now to FIG. 12 in conjunction with FIG. 14, drive disk 390 includes a pin 430 extending therefrom with a tapered tip 432 on the end thereof. The tapered tip 432 is sized for snapping engagement through an elongated slot 434 in extension 436 from leg 438. Slot 434 has a upper opening 440 having a width slightly smaller than the uppermost diameter of tapered tip 432 and a lower opening 442 which is wider than the upper diameter portion of tapered tip 432. The height dimension of pin 430 is slightly greater than the height dimension of slot 440. Leg 438 is pivotally received within appropriate apertured bosses in body portion 322 for pivotal movement relative to the body of the lure. Leg 438 includes an upper and lower pin 450 for receipt within these appropriate apertured bosses.

Leg 438 further includes a connecting arm 452 which has a pin 450 for extending therefrom with a tapered tip 456 at the end thereof. Tapered tip 456 snaps into and cooperates with an aperture 458 within leg 460. Aperture 458 is similar in design to that of slot 434, including an upper portion 462 having a width slightly smaller than the uppermost diameter of tapered tip 456, but not so much smaller that as to prevent snapping engagement of tip 456 therethrough. Aperture 458 includes a lower portion 464 having a somewhat larger width than the uppermost diameter of tapered tip 456. Leg 460 is pivotally received within apertured bosses in main body portion 322 to permit pivotal movement. Leg 460 includes pins 470 for engagement within such apertured bosses.

As can seen in FIG. 12, extension 436 of leg 438 is maintained in its appropriate position by being located below drive disk 390 and above spool 360. In this way, dislocation of extension 436 is prevented by the entrapment of the positioning of the extension between the drive disk and spool. Of course, disengagement is also prevented by the snap engagement of tapered tips 432 and 456, on the distal ends of pins 430 and 454, and engaging the respective slots in which they operate.

Referring again to FIG. 12, body portion 322 is fitted with floatable insert material, such as styrofoam, and the windup mechanism is positioned relatively high within the overall body design. In the primary embodiment, the lure is designed such that it will float at a position such that the windup mechanism is completely or substantially above the waterline of the lure in its floating position, that is, flotation of the lure is designed such that all or a large majority of the windup mechanism is above the water line.

The embodiment of FIGS. 12 through 14 provides a significant advancement by positioning the windup mechanism high in the lure configuration and thus, with the floatable material positioned therein, above or substantially above the water line. Further, the design incorporates a substantially fluid tight enclosure around the windup mechanism to prevent contamination of the mechanism with debris, sand, dirt, or any other material which could interfere with the continuous operation of the unit.

Figures 15, 16:
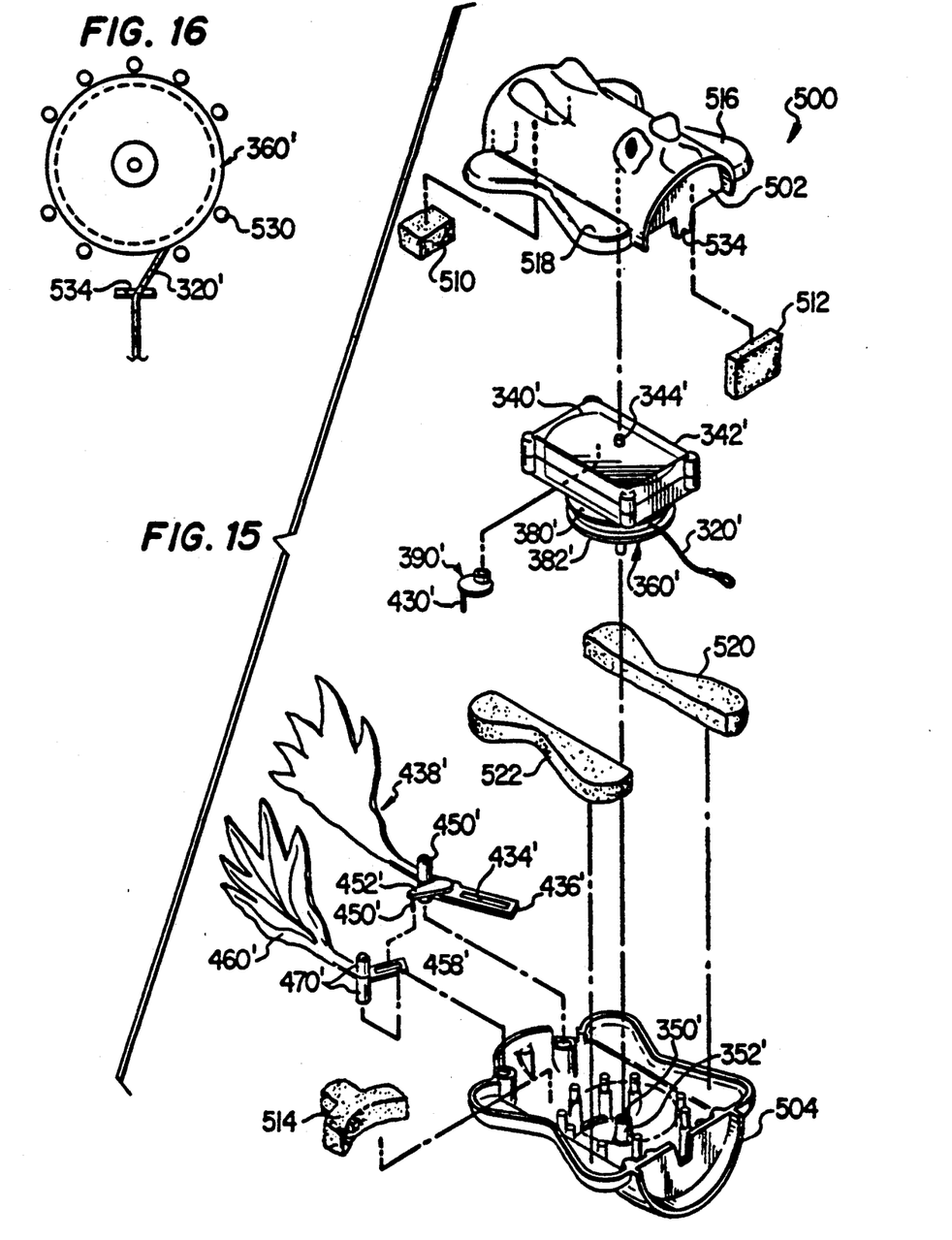
FIG. 15 is an exploded perspective view of a further alternative embodiment of the present invention.
FIG. 16 is a partial horizontal section view showing the relationship of the spool and line to the surrounding lure structure.

FIG. 15 is a perspective exploded view of a further alternative embodiment of the present invention. Referring to FIG. 15, lure 500 includes upper and lower body parts 502 and 504, respectively, and house components similar to those described in detail with respect to the embodiment of FIGS. 12, 13 and 14. Because many of the internal components used in the embodiment of FIG. 15 are identical or are similar to those used in the embodiment of FIGS. 12, 13 and 14, the same numerals will be used to define corresponding components, but with the addition of a prime (') reference added thereto. Thus, lure 500 includes a windup mechanism 340' having a water-tight enclosure 342' therearound and a shaft 344' extending above and below the mechanism. The upper end of shaft 344' is journaled in an appropriate aperture in a boss formed in upper body portion 502. The lower end of shaft 344' is journaled in an aperture 350' in boss 352'. Boss 352' is integrally formed in the lower body portion 504. Similarly, the boss which receives the upper end of shaft 344' is integrally formed in upper body portion 502.

A spool 360' is received on the lower end of shaft 344'. Spool 360' receives a line 320' thereon with its end attached to spool 360' for winding therearound. Spool 360' has upper and lower lips 380' and 382', respectively, to define an area between which line 370' may be wound.

Windup mechanism 340' is similar in structure and operation to that illustrated and described with respect to the prior embodiments. As in the embodiment of FIG. 12, a drive disk 390' is mounted from a shaft extending from below mechanism 340'. Drive disk 390' has a pin 430' for engaging an elongated slot 434' in extension 436' from leg 438'. Leg 438' is pivotally received within appropriate apertured bosses in body portions 502 and 504 for pivotal movement relative to the body of the lure. Leg 438' includes an upper and lower pin 450' for receipt within these bosses.

Leg 438' further includes a connecting arm 452' which has a pin 450' extending therefrom. Pin 450' cooperates with an aperture 458' within leg 460'. Leg 460' is pivotally received within apertured bosses in body portions 502 and 504 and include pins 470' for engagement within such bosses.

The lure of embodiment of FIG. 15 is fitted with floatable insert material, such as styrofoam, to properly position the lure in the water. The upper body portion 502 receives styrofoam pieces 510 and 512 while the upper body portion 504 receives a styrofoam component 514. A significant feature of the embodiment of FIG. 15 includes side stabilizers 516 and 518. These stabilizers are hollow cavities defined at the mid-section of the lure, on the sides thereof. These cavities are filled with styrofoam inserts 520 and 522, respectively. It has been found that by using styrofoam at the mid-section of the lure, and at a position removed from the longitudinal axis of the lure, greater stability is provided. In the preferred embodiment, stabilizers 516 and 518 extend a further distance to the side of the longitudinal axis of the lure than the lure body extends above or below such longitudinal axis. As a result, the lure assumes a level floating position with the motor at a position such that all, or a large portion thereof is above the water line.

The embodiment of FIG. 15 is also unique in providing a means for assuring that the line 320' is retained on spool 360'. To achieve this result, a plurality of pins 530 are integrally formed upwardly from lure body portion 504. These pins are positioned, as shown in FIG. 16, in a close proximity to the outer edge of lips 380' and 382' of spool 360'. Line 320' is routed out of the front of the lure through a slot 534 formed in a tongue from body portion 502. Slot 534 has a beveled surface on the interfacing side to facilitate movement of line 320' therethrough.

As can be seen in FIG. 16, which is a partial horizontal section taken just above spool 360', posts 530 completely surround spool 360' and are positioned at a distance less than the thickness of line 320'. With a 0.030 inch (0.0076 mm) diameter line, the pins are spaced approximately 0.020 inch (0.0051 mm) from spool 360'. As a result, line 320' cannot be dislodged from spool 360' during use. While this is achieved in the embodiment of FIG. 15 using pins 530, it will be appreciated that a wall can be molded so as to extend from lure body portion 504 and adjacent spool 360' to accomplish the result provided by pins 530.

Pins 530 act in concert with a close tolerance provided by slot 534 relative to the gauge of line 370'. This closely toleranced slot, on the order of 0.010 inches greater than the line diameter, precludes the line from being forced into the lure manually, that is before motor 340' has been rotated under its own spring action to draw in the line as described earlier, and therefore precludes slacking of the line around the spool. Where a 0.030 inch (0.0076 mm) diameter line is used, slot 534 has a dimension of from 0.030 inch (0.0076 mm) to 0.050 inch (0.0127 mm), width and height, in the preferred embodiment. In the preferred embodiment, slot 534 has no dimension greater than approximately 2.3 times the dimension of the line. Thus, the design of FIG. 15 is such that line 370' will not become dislodged from spool 360'.

Figures 17, 19, 20:
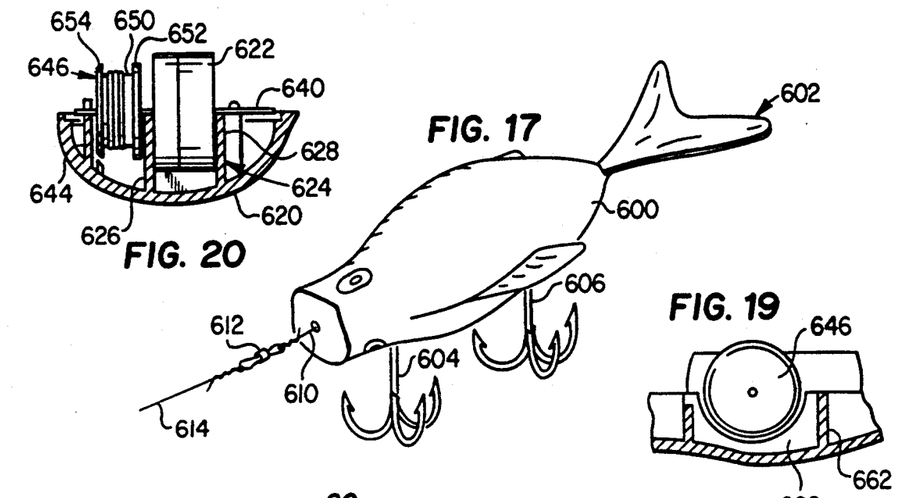
FIG. 17 is a perspective view of an alternative embodiment of the present invention.
FIG. 19 is a partial section view taken along line 19—19 of FIG. 18.
FIG. 20 is a partial section view taken along line 20—20 of FIG. 18.

FIGS. 17 through 22 illustrate a further embodiment of the present invention. In this embodiment, the invention has the external appearance of a shad or similar bait. The lure has a body 600 with a movable tail fin 602 pivotally attached thereto. A pair of treble hooks 604 and 606 are attached to one side of the lure as shown using appropriate eye screws or other means. An actuation line 610 extends from the lure and is attached by a swivel 612 to fishing line 614. As can be seen in FIG. 17, the bait is designed to float on its side and thus takes the position of an injured shad when in the water.

Figures 18, 21, 22:
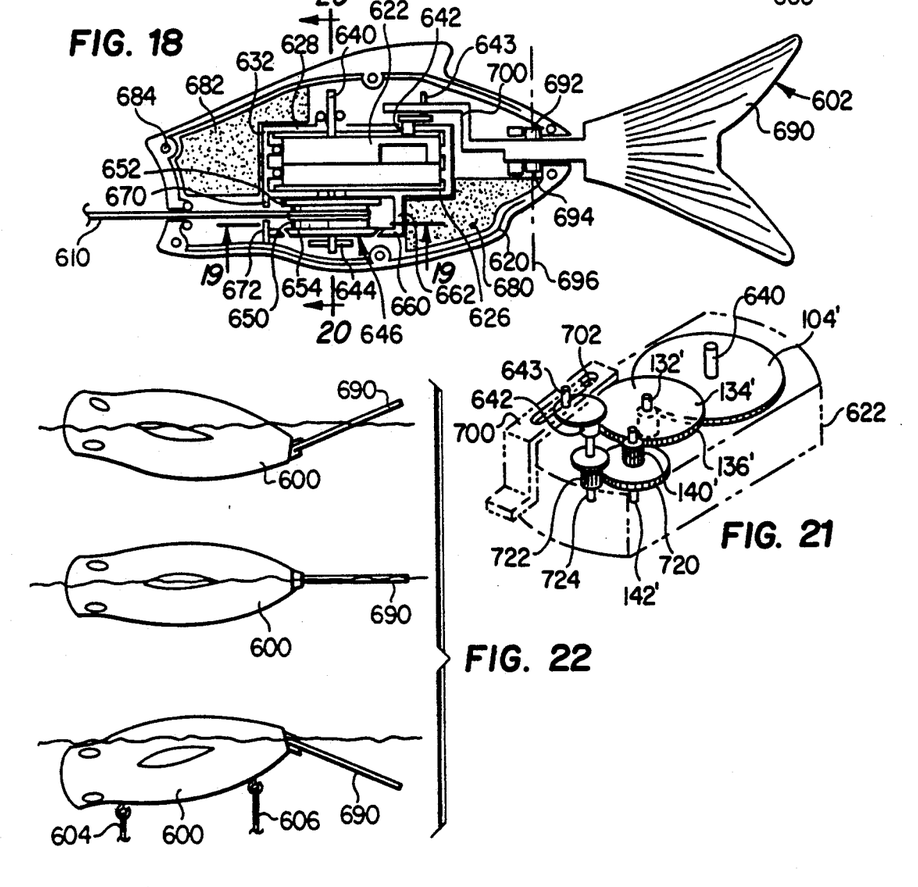
FIG. 18 is a top plan view showing the upper portion of the lure of FIG. 17 removed.
FIG. 21 is a perspective view showing the gears in the motor used in the embodiment of FIGS. 17 and 18.
FIG. 22 is a side view illustrating the movement which can be achieved by the lure in the water.

FIG. 18 shows a top plan view with the upper portion of the lure removed to reveal the interior structure. FIG. 19 is a section view taken along line 19—19 of FIG. 18, and FIG. 20 is a section view taken along line 20—20 of FIG. 18. Referring now to FIG. 18 in conjunction with FIGS. 19 and 20, body 600 includes a shell 620 which houses the components for actuation of the tail fin. In this embodiment, motor 622, which is similar to the motor of the previous embodiments, is captured relative to body 600 by a motor seal 624 which is formed integrally with shell 620. Motor seal 624 includes walls 626 and 628 extending from the side wall of shell 620. Similarly, motor seal walls 630 and 632 extend upwardly from side wall shell 620 to substantially completely envelop motor 622.

Motor 622 has a motor shaft 640 therethrough which extends through appropriate apertures in motor seal 624. Similarly, a drive disk or spinner 642 is attached to a driven shaft extending from the motor and an appropriate aperture is provided through motor seal 624 for such purpose. As can be seen in FIGS. 18 and 20, a spool or wind up wheel 646 is positioned on shaft 640 and the end of shaft 640, to the side of spool 646 opposite the motor, is supported by a shaft support 644 which also extends from shell 620. Drive disk 642 has an upstanding shaft 643 extending perpendicularly therefrom. As a result of this design, motor 622 is accurately and securely positioned relative to shell 620. Further, any loading exerted on the motor is transferred to the body through the motor seal and shaft support 644.

Line 610 is attached to and wound around spool 646. Spool 646 has a reduced circumference core 650 with upper and lower lips 652 and 654, respectively, which define an area between which line 610 may be wound. As can be seen in FIGS. 18, 19 and 20, a circumferential shelf 660 extends from shell 620 to a point closely positioned and in the same plane as lower lip 654. The spacing between shelf 660 and lip 654 is sufficiently close to prevent the passage of line 610 therebetween, thereby assuring that the line remains on the spool. In one embodiment of the invention where a 0.040 in. (1.01 mm) line is used, the spacing between the outside diameter of lip 654 and shelf 660 is 0.035 in. (0.89 mm). As can be seen in FIG. 18, a back wall 662 is provided between shelf 660 and wall 626 of motor seal 624. Similarly, a relatively small gap is provided between the confronting surfaces of extensions 670 and 672 (FIG. 18) to assure that line 610 retains its position on spool 646. A relatively close fitting opening 674 is provided in the mouth of shell 620 through which line 610 passes. Shell 620 is filled with an appropriate ballast material pieces 680 and 682 to provide flotation for the lure. In one embodiment of the invention, a closed cell styrofoam is used for pieces 680 and 682. Registration apertures 684 are provided for receiving pins from the top half of the lure for purposes of assembling the two halves together.

Tail fin 602 includes a fin section 690 attached to a pivot shaft 692 which is received within a curved bearing surface 694 formed integrally with shell 620. Pivot shaft 692 defines a pivot axis 696 about which the tail fin moves. Fin 602 has an extension arm 700 with a slot 702 (FIG. 21) in the end thereof for receiving spinner shaft 643 therein.

Referring to FIG. 21, the interior gears of motor 622 are shown. Although the gears are substantially similar to those of windup mechanism 80 of FIGS. 4, 5 and 6, there is a slight modification which permits a higher gearing for a faster rotation of drive disk 642. This higher gearing is chosen in this embodiment because the actuation of only one appendage is necessary, rather than the two appendages driven in the embodiment of FIGS. 1 through 6. Referring to FIG. 21, corresponding gears are identified using numbers for identifying the gears in FIG. 6 with the exception that a prime (') designation is added. In the embodiment, gear 104' is attached to and rotates with motor shaft 640. Further, gear 104' meshes with gear 136' which rotates with and is positioned by shaft 132'. A larger gear 134' also is attached to gear 136' and meshes with and drives gear 140' which is made with and rotates on integral shaft 142'. In the present embodiment, an enlarged gear 720 is formed integrally with gear 140' and meshes with gear 722 which rotates on shafts 724. Shaft 724 is the driven shaft to which drive disk 642 is attached. It will be understood that the remaining structure and spring arrangement shown in FIGS. 5 and 6 are incorporated in the motor described in FIG. 21.

With the addition of gear 720, the gear train used in the embodiment of FIGS. 17 through 22 causes a faster rotation of driven shaft 724 than the corresponding driven shaft of the previously described embodiments, while this has been found to be beneficial, it will be understood by those skilled in the art that other gear train ratios may be used to accomplish the present invention and may be substituted depending upon size of the tail fin and the action desired in the water. Further, depending upon the amount of submersion of the tail fin, various gear ratios and springs may be used to operate the present invention.

It has been found that the thickness of the spring incorporated in the embodiment is important to the proper operation of the lure. An optimum thickness has been found to be between 0.08 and 0.13 millimeters, with a preferred thickness of 0.11 millimeters. This thickness is required such that the pull force to activate the motor is on the order of 100 to 150 grams while providing sufficient force to drive the tail fin and overcome any resistance caused by the presence of water or contaminants in the lure and around the fin.

The operation of the lure is as follows. The lure is assembled as shown with approximately three inches of line wound around the spool 646. The spring is also slightly in tension with line 610 being retained from movement into the lure body by swivel 612 engaging the cupped mouth of the lure. As the lure is cast out, the impulse momentum of the lure as it is cast causes the line to be pulled from the lure and the spool to rotate. This in turn winds the spring in motor 622. When the lure enters the water, it assumes a position on its side, such as shown in FIG. 22, the hooks 604 and 606 orienting the lure in the manner shown. Further, the materials used, including the ballast material 680 and 682, and the position and weight of the hooks, cause the lure to be in position in water such that it floats about midline or slightly below, that is with about half of the lure body out of the water and half submerged. In this way, fin 602 is positioned on the surface or slightly submerged therebelow.

As force on line 610 is removed, with the lure resting on the water, the spring in motor 622 begins to unwind and in turn rotates drive disk 642. The rotation of drive disk 642 drives disk shaft 643 in slot 702 (FIG. 21) of fin extension 700 and causes tail fin 602 to rotate about pivot axis 696. Thus, the lure tail fin begins to pivot about an axis which is substantially horizontal, that is substantially parallel to the water surface. This movement of the tail fin causes an undulating or fluttering movement of the lure on the water. In a primary embodiment, the fin slightly breaks above the water surface as the fin pivots upwardly. This allows the fisherman to see the movement of the fin and causes a ripple effect on the water. With the lure positioned on its side, the bait also accurately imitates an injured shad or other bait fish thereby making the present lure extremely effective in attracting and catching game fish of all types.

With this structure, it has been found that loading on spool 642 of 20 pounds or more can be imposed without dislocating the motor, the spool or the drive disk. Because the present product is used as a lure for fish of varying sizes, including bass, pike and muskie, the present design is capable of withstanding the forces which the lure may encounter in hooking such game fish. It will be noted that this action is made possible, in part, because of the horizontal position of pivot axis 696 and the substantially flat fin surface which moves in radial planes passing through pivot axis 696. The motion of the tail fin not only causes the body of the lure to undulate or bob, the tail fin itself moves in and out of the water causing a fluttering action which has not heretofore been possible in a fishing lure.

When the motor spring has unwound, the motor can be reset by simply "chugging" or applying short quick pulls to line 610. By applying a short jerk to the line, line 610 is withdrawn from the lure causing the rotation of spool 642, shaft 640 and gear 104' attached thereto. The concave or cup face of the lure provides sufficient resistance to assist in this withdrawal of the line from the lure. The rotation of spool 642 in turn winds the spring within motor 622 and upon providing slack in line 610, the motor begins to unwind and again pivots tail fin 602 to cause the fluttering and undulating action described above. By carefully selecting the spring material for the spring in the motor, the gearing in the motor, the diameter of the spool 646, and by using a slightly concave face to the lure, a pull force for winding the lure of from 100 to 150 grams can be achieved. Further, such specifications provide a lure which has sufficient power to repeatedly operate tail fin 602.

As can be appreciated in the present design, the motor is sealed by using motor seal 624 to prevent most, if not all, contaminants from entering the motor and causing its failure. Further, the motor is accurately and securely positioned within the body because it is captured by motor seal 624. The structure used adjacent spool 646 assures that line 610 cannot become dislodged from the spool during winding and unwinding. Thus, the present design provides a surface bait which has an extremely lifelike action which can be repeatedly activated with minimal force by the fisherman from an external position remote from the lure. Further, the lure movement is complimented by the clicking sound caused by the winding and unwinding of the motor. This sound has been found to add to the effectiveness of the lure.

While the lure has been described as a surface lure, it will be appreciated that appropriate weights or other means can be used to submerge the lure so that it provides its lifelike movement at levels below the water surface. Further, although the above embodiment has been described as a lure which is actuated by a spring wound motor 622, it will be appreciated that other energy storage mechanisms can be substituted. For example, a miniature electric motor can be substituted and appropriate circuitry designed therein such that upon applying a sufficient force to line 610, the motor is actuated to pivot tail fin 602. The electric motor may be designed such that upon applying a second sharp pull to the line, the motor is deactivated and subsequently reactivated by a further line pull. Of course, other energy storage mechanisms can be substituted as desired.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the spirit and scope of the invention.

I claim:

1. A fishing lure for use in a body of water having a lure body with hooks attached hereto comprising:
    an energy storage mechanism,
    a line connected to said energy storage mechanism and extending from the lure body, said energy storage mechanism being operable by engagement of said line,
    an appendage extending externally of said lure body for movement about a substantially horizontal axis upon operation of said energy storage mechanism.
    a gear drive train driven by said energy storage mechanism to drive said appendage, said drive train providing movement to said appendage, and
    ballast means positioned on the sides of said lure body, at least a portion of said ballast means extending a distance to the side of the longitudinal axis of the lure which is greater than the distance the lure body extends above or below such longitudinal axis.

2. A fishing lure for use in a body of water having a lure body with hooks attached thereto comprising:
    an energy storage mechanism housed within the lure body having a windup spool attached thereto,
    a line connected to said windup spool and extending from the lure body, said energy storage mechanism being operable by engagement of said line,
    an appendage extending externally of said body and pivotally attached thereto for movement upon operation of said energy storage mechanism about a substantially horizontal axis, and
    a gear drive train driven by said energy storage mechanism to drive said appendage, said drive train providing movement to said appendage, and
    a shelf extending from the lure body substantially in the plane of the windup spool remote from the energy storage mechanism and in close proximity thereof to prevent the line from dislodging from the windup spool past such shelf.

3. A fishing lure for use in a body of water comprising:
    a lure body,
    a windup mechanism mounted in positioned relation to said body by extension formed integrally from the walls of said body, said windup mechanism comprising a housing, a windup shaft supported by said housing, a coil spring wound around said shaft with one end engaged to said housing and the opposite end engaged to said shaft, said spring being operable to be coiled upon rotation of said shaft and uncoiled upon release thereof, a spinner shaft supported by said housing and having a portion extending exteriorly of said housing, and gear means between said windup shaft and said spinner shaft for driving said spinner shaft upon uncoiling of said coil spring,
    a windup wheel attached to said windup shaft exteriorly of said housing,
    a line connected to and wound around said windup wheel and extending from the lure, said wheel being rotatable to coil said coil spring by pulling said line from the lure as the lure is in the water,
    a spinner wheel attached for rotation with said spinner shaft, and
    an appendage extending externally of said lure and pivotally attached thereto and driven by rotation of said spinner wheel about a substantially horizontal axis.

4. The fishing lure according to claim 3 further comprising:
a shelf extending from the lure body substantially in the plane of the windup spool remote from the energy storage mechanism and in close proximity thereof to prevent the line from dislodging from the windup spool past said shell.

5. The lure according to claim 3 further comprising:
cage means extending from said body and adjacent said spool to prevent said line from becoming dislodged from said spool.

6. The lure according to claim 3 wherein the unwinding of said windup mechanism in conjunction with the movement of said appendage produces an audible sound during operation.

7. The fishing lure according to claim 3 further comprising:
ballast means positioned on the sides of said lure body at the midsection thereof, said ballast means extending a further distance to the side of the longitudinal axis of the lure than the lure body extends above or below such longitudinal axis.

8. The fishing lure according to claim 3 wherein said appendage is a tail fin having a flat portion in a plane including said horizontal axis.

9. The fishing lure according to claim 3 wherein said appendage is a tail fin having a substantially flat surface and wherein said lure body floats on the water such that at least a portion of said fin moves in and out of the water during operation of the energy storage mechanism.

10. A fishing lure for use in a body of water have a lure body with hooks attached thereto comprising:
a windup mechanism housed within the lure body having a windup spool attached thereto,
a line connected to said windup spool and extending from the lure body, said windup mechanism being operable by engagement of said line,
appendage means extending externally of said body for movement upon operation of said windup mechanism,
drive train means driven by said windup mechanism to drive said appendage means, said drive train means providing movement to said appendage means, and
a shelf extending from the lure body and circumferentially around the wind up spool, said shelf being substantially in the plane of the edge of the spool remote from the wind up mechanism and in close proximity thereof to prevent the line from becoming dislodged from the spool past said shelf.

11. A fishing lure for use in a body of water having a lure body with hooks attached thereto comprising:
an energy storage mechanism housed within the lure body having a windup spool attached thereto,
a line connected to said windup spool and extending from the lure body, said energy storage mechanism being operable by engagement of said line,
an appendage extending externally of said body and pivotally attached thereto for movement upon operation of said energy storage mechanism about a substantially horizontal axis, and
a shelf extending from the lure body substantially in the plane of the windup spool remote from the energy storage mechanism and in close proximity thereof to prevent the line from dislodging from the windup spool past such shelf.

* * * * *